Sept. 20, 1960 A. C. BARR ET AL 2,953,324

STEER DAMPER

Filed Dec. 12, 1956 7 Sheets-Sheet 1

Inventors
Aaron C. Barr
R. Glenn Gorman
Frank C. Minch
Bernard E. O'Connor
James G. Weaver by Hill, Sherman, Meroni, Gross & Simpson Attys.

Sept. 20, 1960 A. C. BARR ET AL 2,953,324

STEER DAMPER

Filed Dec. 12, 1956 7 Sheets-Sheet 2

Inventors
Aaron C. Barr
R. Glenn Gorman
Frank C. Minch
Bernard E. O'Connor
James G. Weaver by Hill, Sherman, Meroni, Gross & Simpson Attys.

Sept. 20, 1960 A. C. BARR ET AL 2,953,324
STEER DAMPER
Filed Dec. 12, 1956 7 Sheets-Sheet 3

Inventors
Aaron C. Barr
R. Glenn Gorman
Frank C. Minch
Bernard E. O'Connor
James G. Weaver
by Hill, Sherman, Meroni, Gross & Simpson
Attys.

Inventors
Aaron C. Barr
R. Glenn Gorman
Frank C. Minch
Bernard E. O'Connor
James G. Weaver by Hill, Sherman, Meroni, Gross & Simpson Attys.

Sept. 20, 1960 A. C. BARR ET AL 2,953,324

STEER DAMPER

Filed Dec. 12, 1956 7 Sheets-Sheet 5

Inventors
AARON C. BARR
R. GLENN GORMAN
FRANK C. MINCH
BERNARD E. O'CONNOR
JAMES G. WEAVER by Hill, Sherman, Meroni, Gross & Simpson Attys.

Sept. 20, 1960 A. C. BARR ET AL 2,953,324

STEER DAMPER

Filed Dec. 12, 1956 7 Sheets-Sheet 6

Inventors
AARON C. BARR
R. GLENN GORMAN
FRANK C. MINCH
BERNARD E. O'CONNOR
JAMES G. WEAVER by Hill, Sherman, Meroni, Gross & Simpson Attys.

STEER DAMPER

Inventors
AARON C. BARR
R. GLENN GORMAN
FRANK C. MINCH
BERNARD E. O'CONNOR
JAMES G. WEAVER by Attys.

United States Patent Office 2,953,324 Patented Sept. 20, 1960

2,953,324

STEER DAMPER

Aaron C. Barr, Detroit, Mich., Richard Glenn Gorman, Los Angeles, Calif., Frank C. Minch, Dayton, Ohio, Bernard E. O'Connor, Los Angeles, Calif., and James G. Weaver, Royal Oak, Mich., assignors to Houdaille Industries, Inc., Buffalo, N.Y., a corporation of Michigan Filed Dec. 12, 1956, Ser. No. 627,938

10 Claims. (Cl. 244—50)

This invention relates to a control system for controlling movable elements of aircraft or the like, and particularly to a steering and/or damping assembly for aircraft.

It is an important object of the present invention to provide a novel control system for controlling movable elements of aircraft or the like.

It is another important object of the present invention to provide a novel steering and/or damping assembly for aircraft.

A more specific object of the invention resides in the provision of a steering system for aircraft and the like wherein the steering control is coupled to a hydraulic steering system by an electric circuit.

Another more specific object of the invention resides in the provision of a novel hydraulic control structure.

A further object of the invention is the provision of a novel electrical system for coupling a steering control to a hydraulic steering system.

Still another object resides in the provision of an electrical-hydraulic steering system having means preventing operation of the system until the steering control is in correspondence with the wheel position within predetermined limits.

A still further object is to provide means for automatically centering a wheel assembly or the like independently of the operating control.

Yet another object of the invention is to provide a novel wheel support structure incorporating a hydraulic control system.

It is also an object of the invention to provide novel safety features for an electrical-hydraulic control system.

Other and further objects, features and advantages of the present invention will be apparent from the following detailed description taken in connection with the accompanying drawings, in which.

As shown on the drawings.

In describing an illustrative embodiment of the present invention, the schematic representation of the over-all system in Figures 1 and 2 will first be described, and thereafter an actual physical embodiment of the steer damper mechanism will be referred to.

Figure 1:
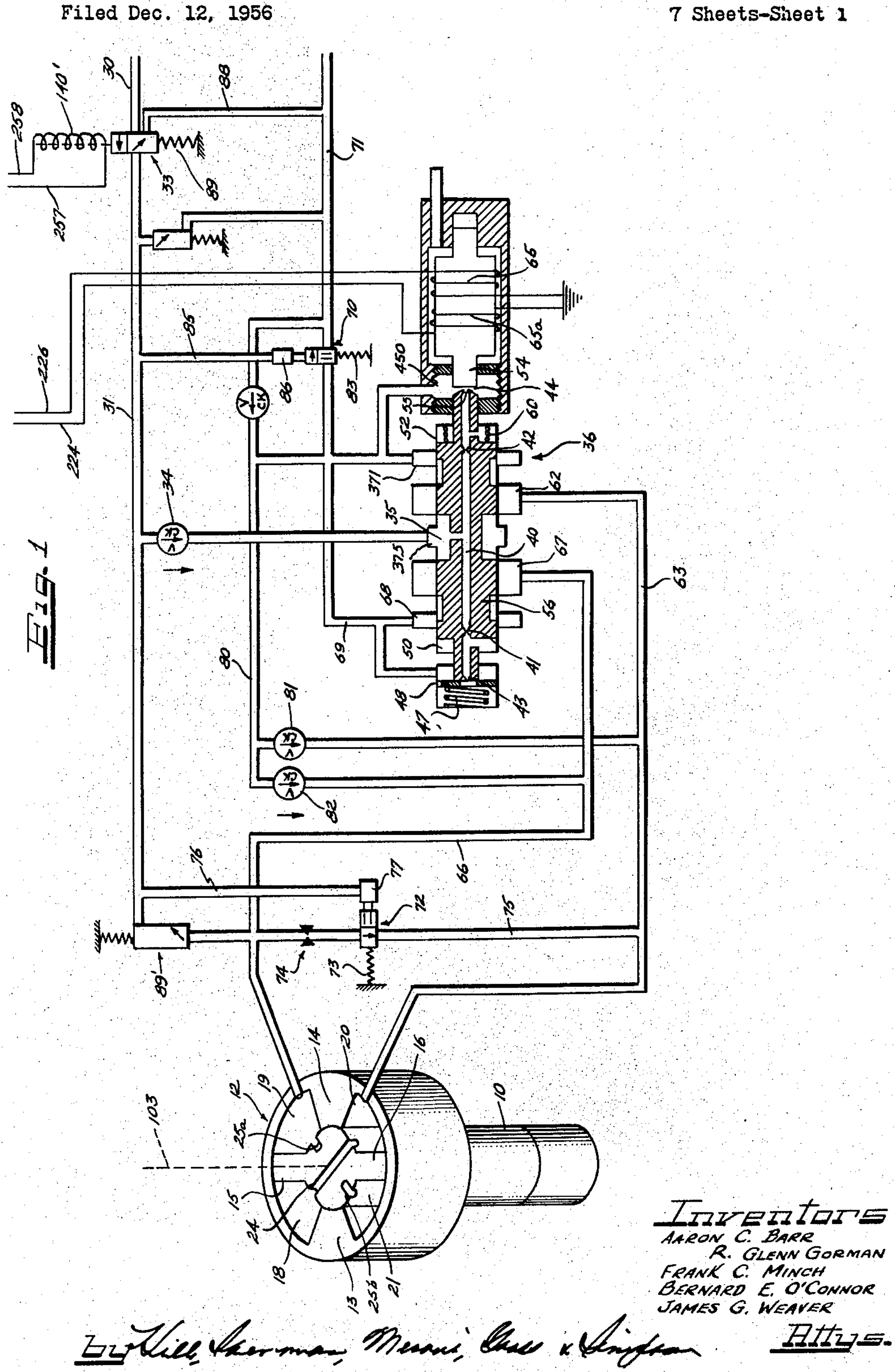
Figures 1 and 2 represent a diagrammatic illustration of an electrical-hydraulic control system in accordance with the present invention.

In Figure 1, the reference numeral 10 designates a shaft which transmits torque to a wheel of an aircraft, or the like. The shaft 10 is illustrated as being coupled to a hydraulic control mechanism 12 which would normally be mounted on the aircraft wheel assembly. As schematically illustrated in Figure 1, the mechanism for damping or otherwise controlling the angular movement of the shaft 10 comprises a pair of stationary vanes 13 and 14, and a pair of movable vanes 15 and 16 secured for angular movement with the shaft 10. In an actual physical embodiment, the respective vanes define working chambers such as indicated at 18, 19, 20 and 21 in a manner well understood in the art. In the diagrammatic illustration, communication is established between the chambers 18 and 20 by means of a suitable passage indicated at 24, and communication between the chambers 19 and 21 is established by means of a passage, parts of which are designated **25*a* and 25*b***.

Control pressure may be supplied to the working chambers in the manner diagrammatically illustrated in Figure 1 wherein a supply line 30 is connected to a source of hydraulic pressure. Hydraulic pressure is admitted to a high pressure line 31 under the control of a three-way solenoid valve indicated diagrammatically at 33. Fluid under pressure flows through the solenoid valve 33 in its energized open condition and through an inlet check valve 34 to an inlet chamber 35 of a servo control valve assembly indicated at 36.

Within the valve mechanism 36, fluid is distributed from the inlet chamber 35 through the central passage 40 of the valve and flows through one of the identical orifices 41 and 42 and then through metering orifice 43, or discharge orifice 44. The pressure drops across orifices 41 and 42 are equal. The pressure drop across orifice 43 is constant due to its fixed size. Since there is a relatively constant inlet pressure in the inlet chamber 35, and since a relatively constant pressure is maintained at the downstream side of the orifice 43, it will be seen that the pressure in chamber 50 will be a constant pressure intermediate the inlet and discharge pressures. The pressure in the chamber 52 upstream of the discharge orifice 44 on the other hand will be dependent on the size of orifice 44 between armature 54 and valve body 56 which is always smaller than the orifice 55 at the right hand end of the valve body. As the armature 54 is moved toward the valve body 56 the pressure in chamber 52 will tend to increase above that maintained in the chamber 50 to shift valve body 56 to the left in Figure 1, while as the armature 54 is moved away from the valve body, the pressure in the chamber 52 tends to decrease whereupon the pressure in the chamber 50 will force the valve body 56 to the right. The force exerted by the spring 47 and piston 48 on the left end of the valve body 56 is balanced with the action of the spring 60 in the chamber 52 at the right end of the valve body 56 so that when system pressure is removed from the passage 40 for any reason, the opposing springs 47 and 60 will act to snap the valve body 56 into its central position illustrated in Figure 1.

To produce a clockwise movement of the shaft 10 as viewed from the top in Figure 1, pressure must be supplied to chambers 18 and 20, and to accomplish this, the valve body 56 must be shifted to the right. The flow of pressure from the inlet chamber 35 of the valve 36 to the chamber 62 and line 63 may be produced by establishing current flow in solenoid coils 65 and 65*a* in the proper sense. The rate of turning of shaft 10 in the clockwise direction will be dependent on the amount of current flow in the solenoid windings. Displacement of the valve body 56 to the right also connects the line 66 leading from chambers 19 and 21 through chamber 67 to outlet chamber 68, outlet line 69, outlet control valve 70 and low pressure line 71.

If counterclockwise rotation of the shaft 10 is desired, the valve body 56 is shifted to the left and pressure is supplied from the inlet chamber 35 through the chamber 67, line 66 and thence to working chambers 19 and 21 of the wheel control mechanism 12.

The operation of the wheel control system also includes provision for damping the oscillation of shaft 10 to prevent shimmy. With no hydraulic or electric power applied in the system, the springs 47 and 60 center the valve body 56 in its central position shown in Figure 1 to block off the passages 66 and 63. Normal turning of the shaft 10 is accommodated by means of the damping control valve indicated at 72 which is shown in its open position in Figure 1, the valve 72 being urged into its open position by means of a spring 73. A damping orifice illustrated diagrammatically at 74 is disposed in the line 75 in series with valve 72 and accommodates a gradual interchange of fluid between the two pairs of working chambers as shaft 10 turns. However, any sudden shimmy movements of the shaft 10 will be damped by means of the damping orifice 74. Line 76 is illustrated as being operative to apply system pressure to a control 77 to shift the valve 72 into closed position when the three-way valve 33 is opened for operation in the steering mode. This prevents a loss of torque in the working chambers during the steering mode. Cavitation is prevented in the working chambers by maintaining a suitable back pressure on return line 80 and admitting fluid to the chambers 18 and 20 through check valve 81 and to chambers 19 and 21 through check valve 82. As seen in Figure 1, the control valve 70 is normally closed due to the action of spring 83 and is moved to open position through the action of hydraulic control line 85 and control 86 when the control valve 33 is open to place the system in condition for steering operation. A thermal relief valve 89' is provided between line 66 and line 31.

The electrical steering control circuit will now be described, having reference to Figure 2 of the drawings.

Figure 2:
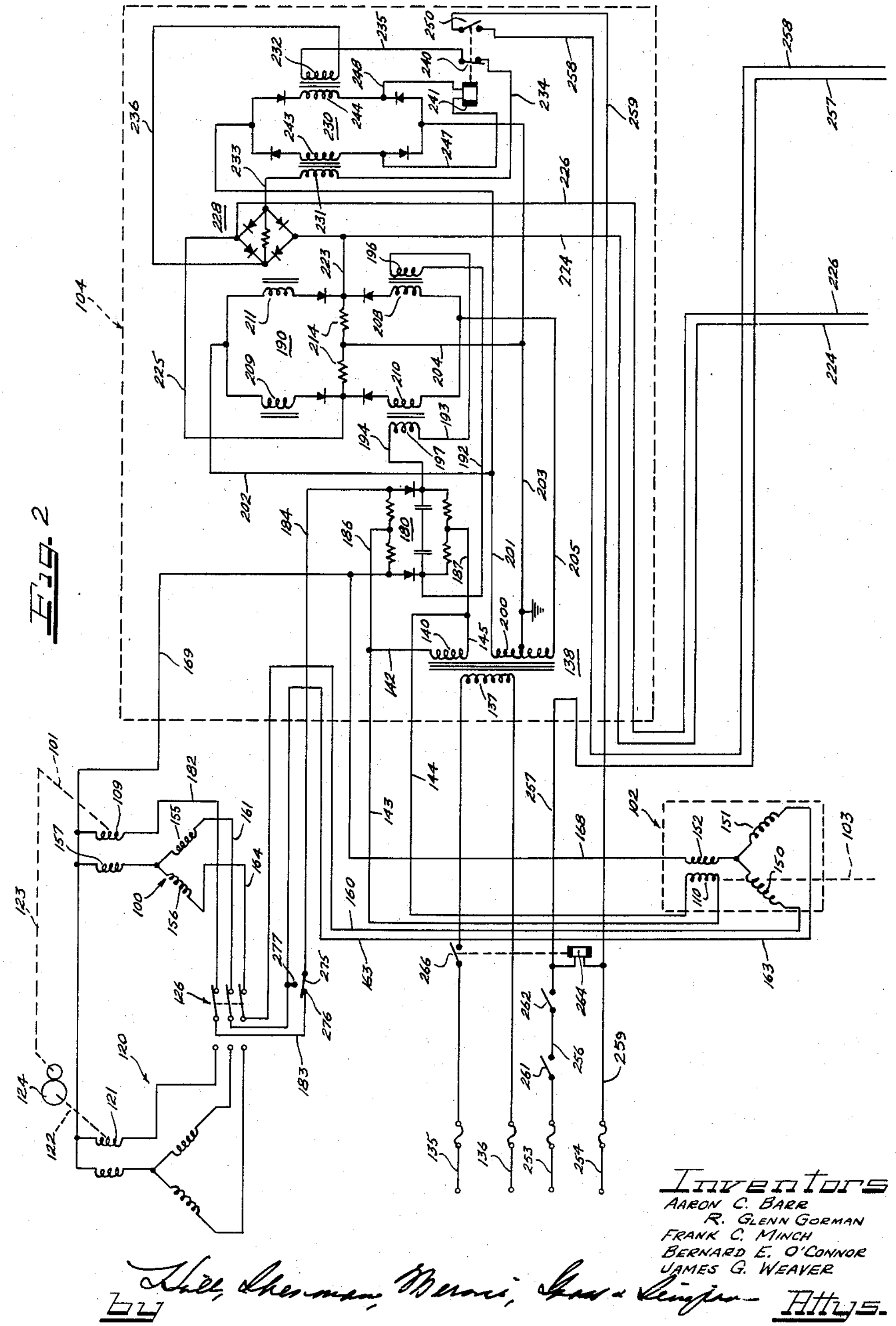

Referring to Figure 2, the reference numeral 100 designates a rudder position synchro transmitter assembly which is controlled by means of a linkage schematically indicated at 101 coupled to the pilot's rudder bar. A second synchro transmitter 102 is coupled to shaft 10 as indicated by the dashed line 103. A discriminator and magnetic amplifier circuit indicated at 104 controls the servo valve assembly 36 in accordance with the difference in position between the rudder transmitter 100 and the wheel position transmitter 102. More specifically, the output from the discriminator and magnetic amplifier circuit is supplied to windings 65 and 65*a* of the servo valve assembly 36 shown in Figure 1 for shifting the armature 54 a distance and direction dependent upon the magnitude and direction of the difference in position between rotors 109 and 110 of the synchro transmitters 100 and 102.

Referring to Figure 2, it will be observed that a low ratio synchro transmitter 120 may have its rotor 121 coupled to linkage 101 as indicated by dash lines 122 and 123 through a suitable reduction mechanism 124, such as reduction gearing. A three-pole double throw switch 126 is provided for selecting the desired ratio between rudder bar movement and movement of shaft 10.

The synchro transmitters are energized from A.C. supply lines 135 and 136 which are connected to primary 137 of power transformer 138. Secondary 140 of the transformer is connected to rotor winding 110 by means of conductors 142, 143, 144 and 145. Windings 150, 151 and 152 of transmitter 102 are connected to windings 155, 156 and 157 of transmitter 100 by means of conductors 160, 161, 163, 164, 168 and 169. The signal induced in rotor 109 due to energization of rotor winding 110 will thus depend upon the angular position of rotor 109 relative to rotor 110. The excitation frequency may, for example, be 400 cycles per second.

In operation of the system of Figure 2, a difference in position between the rudder bar linkage 101 and the shaft 10 produces an error signal in the form of a 400 cycle excitation voltage, modulated by an A.C. signal representing the mechanical input. The amplitude and phase of the A.C. modulating signal represent the magnitude and direction of the position error. To convert the error signal into a D.C. signal proportional in magnitude and polarity to the magnitude and direction respectively of the position error, a discriminator 180 is connected to rotor 109 through lines 169, 182, 183 and 184. The excitation voltage at secondary 140 is referenced to discriminator 180 by conductors 142, 145, 186 and 187. The output of the discriminator is coupled to a push-pull doubler type magnetic amplifier stage 190 by means of conductors 192, 193 and 194 and windings 196 and 197.

The push-pull doubler stage 190 is energized from a center-tapped secondary 200 of power transformer 138 through conductors 201, 202, 203, 204 and 205. Winding 196 is on the same magnetic core as windings 208 and 209, while winding 197 is on the same core as windings 210 and 211. During each half cycle of the excitation voltage from secondary 200, a maximum signal from the discriminator 180 will cause saturation of one diagonally opposite pair of doubler windings while the other diagonally opposite pair of windings will be unsaturated. The saturated condition of the windings 208, 209, 210 and 211 is one of low A.C. impedance, while the unsaturated condition represents a high A.C. impedance. Thus, for a maximum signal from the discriminator, center-tapped resistance 214 will receive two unidirectional pulses during each complete cycle of the A.C. excitation voltage. When the output from the discriminator 180 is of opposite polarity, the polarity of the output pulses from doubler 190 will also be opposite. At values of input signal less than maximum, the output will not be complete sine wave pulses, but since the load on the first magnetic amplifier is inductive, the wave shape is not critical. For zero input to the magnetic amplifier, the two ends of the center-tapped resistor 214 are at the same potential and hence the net voltage across the resistor is zero.

The output from load 214 is fed to the solenoid 65, 65*a* by means of leads 223, 224, 225 and 226. The same output from doubler 190 is fed to a bridge rectifier 228 and the unidirectional output of the bridge rectifier 228 is fed to windings 231 and 232 of the second magnetic amplifier 230 by means of conductors 233, 234, 235 and 236. A normally closed contact 240 of relay 241 is interposed in series with windings 231 and 232. The second magnetic amplifier is of the doubler type and has windings 243 and 244 magnetically coupled to windings 231 and 232, respectively. With zero input, the output of the second amplifier is a maximum. The amplifier is so designed that for signals corresponding to position errors greater than plus or minus one degree between rotors 109 and 110, the input to the second amplifier will be sufficient to produce cut-off of the amplifier and deenergization of the relay 241 which is connected by conductors 247 and 248 to the output terminals of the second amplifier. Contact 250 of relay 241 thus will remain open for position errors larger than one degree to prevent energization of solenoid 140′ of the hydraulic control valve 33. Solenoid 140′ is connected with the 24 volt D.C. supply lines 253 and 254 through contact 250 by means of conductors 256, 257, 258 and 259. The D.C. circuit is controlled by the pilot's power switch 261 and the landing gear safety switch 262 which opens when the landing gear is retracted. Relay 264, which is connected between D.C. supply lines 257 and 259, controls a contact 266 in the 110 volt cycle supply line 135.

It will be appreciated that the one degree error lock out relay 241 prevents engagement of the servo unless the rudder and wheel are aligned within one degree. In the event of a hydraulic or electric power failure, the system will function simply to damp oscillation of the wheel. Since there is no mechanical connection between the steering unit and the rudder pedals, mechanical damage or failure resulting in jamming of the nose wheel steering system cannot interfere with the flight controls of the aircraft. The hydraulic power control valve 33 permits steering at the pilot's option and prevents steering while the landing gear is retracted through the action of the landing gear safety switch 262. The use of magnetic amplifiers eliminates the necessity of a warm-up time and permits immediate use of the control system.

Under certain circumstances it will be desirable to automatically center the nose wheel when the rudder bar for flight control requirements is off center. To accomplish this function, an optional centering device in the form of a switch 275 may be included in the control circuit. The switch is a simple single pole, double throw type, which may be mounted for operation by the pilot or by a trip on the landing gear. The switch is ordinarily set at a normal position, making contact with terminal 276 to energize the usual control by the rudder bar and attached synchros. When the switch is moved to the optional centering position, making contact with terminal 277, an alternate circuit is set up that will automatically center the wheel. The functioning of this alternate circuit is described as follows:

At initial assembly, the synchro transmitter 102 at the damper is adjusted by rotation to a position such that a zero control current will be generated when the wheel and shaft 10 are at a straight forward position. When the automatic centering switch 275 is thrown to the "centering" position, winding 151 of synchro transmitter 102 is connected through line 163, terminal 277, switch 275, and line 184 to one input terminal of discriminator 180, as will be apparent from Figure 2. Winding 152 is connected by line 168 to the other input terminal of discriminator 180. An error signal is thus generated so long as rotor winding 110 causes a net voltage to be induced in windings 151 and 152, and the shaft 10 will be rotated by hydraulic power until the previously established centered wheel position is reached.

The principle behind the centering device is to switch out of the circuit, the actual rudder pedal or steering wheel position transmitter whether the transmitter be a synchro type as illustrated or a potentiometer type position transmitter, and to switch into the circuit in place of the position transmitter the electrical equivalent of the rudder bar in center position.

As a further example, if 100 ohm linear potentiometer position transmitters were used, the centering position could be simulated by switching into the circuit two 50 ohm resistors. In most potentiometer circuits of this type it would not even be necessary to switch in exactly the same value of resistance, so long as the relative proportions correspond to the center position of the transmitter.

For a synchro type circuit, a resistor network may be used to simulate center position of the rudder transmitter if desired.

It will be understood that the synchro transmitter could be replaced by suitable potentiometers and that other types of servo valves could be utilized. The various parts of the system may be arranged in various manners in relation to the remainder of the aircraft or the like, depending on the structure of the components, but for purposes of illustration, we have herein shown an installation of a steering control system in accordance with the present invention.

Figures 3, 4:
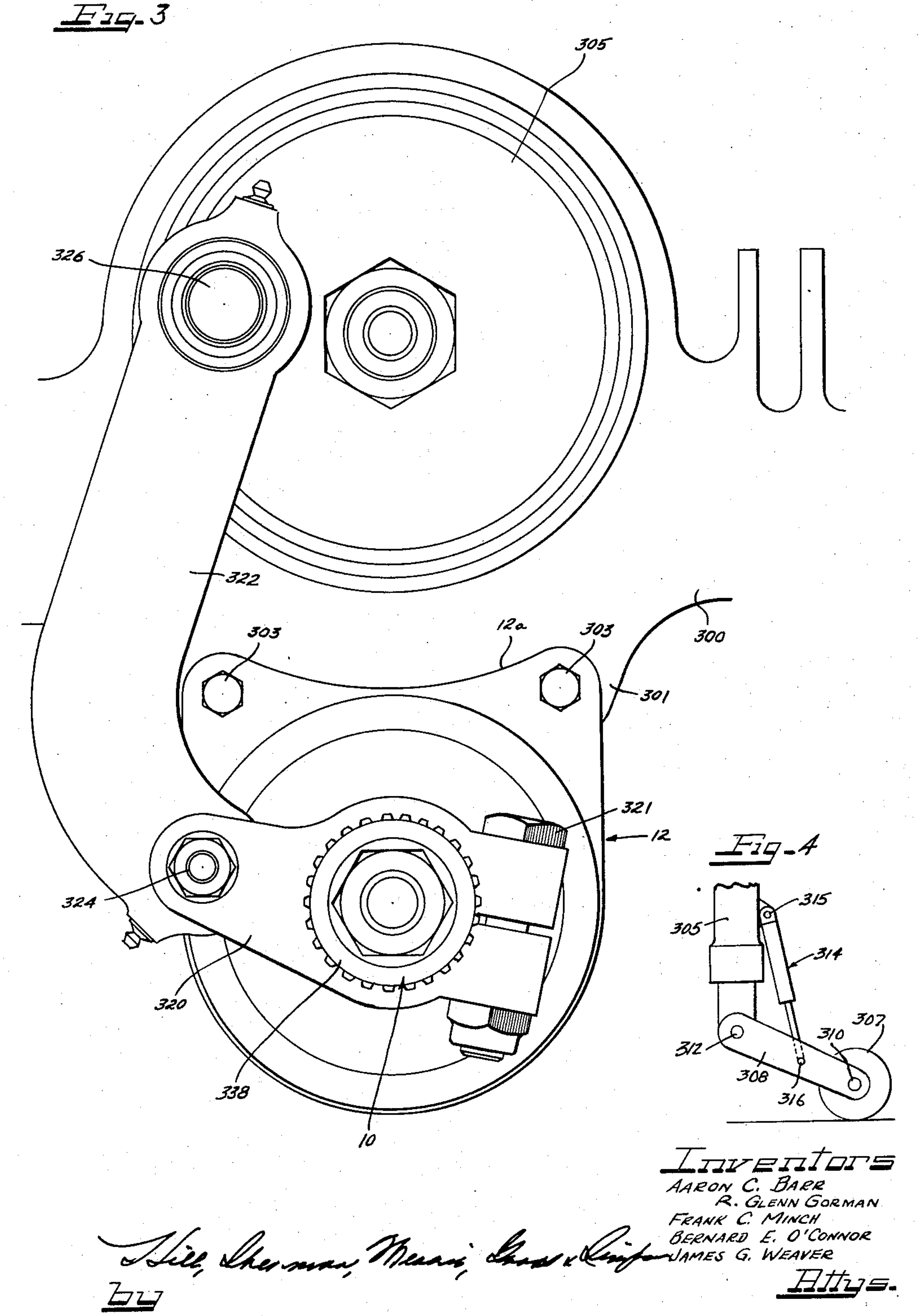
Figure 3 is a fragmentary top plan view of a portion of a wheel support structure in accordance with the present invention.
Figure 4 is a diagrammatic side elevation view of further portions of the wheel support structure in accordance with the present invention.

Figure 3 illustrates somewhat diagrammatically the manner in which the damper assembly may be carried on the aircraft. In Figure 3, the damper shaft is indicated at 10 and is associated with the damper assembly 12 as diagrammatically illustrated in Figure 1 except that the damper assembly is inverted in Figure 1 relative to its true orientation as illustrated in Figure 3. A horizontal support structure 300 may be suitably carried from the fuselage of the aircraft in such a manner that the entire mechanism carried by the support 300 may be retracted during flight of the aircraft. The horizontal support structure 300 is illustrated as having flanges such as 301 to which flanges such as 12*a* of the damper assembly are secured by means of bolts 303. The horizontal support structure 300 carries a shaft 305 which is coupled to the nose wheel in any suitable manner. Preferably the shaft 305 is journaled in the support structure 300 for 360° rotation to accommodate 360° rotation of the nose wheel. Figure 4 illustrates diagrammatically the manner in which the nose wheel 307 may be coupled to the shaft 305. The nose wheel fork 308 is indicated as mounting the wheel 307 on a shaft 310 with the fork 308 pivotally coupled to the shaft 305 by means of a horizontal pin 312. Vertical movement of the wheel 307 is damped by means of the shock absorber assembly 314 which is pivotally carried by the shaft 305 on a pin indicated at 315 and is pivotally connected to the fork 308 as indicated at 316. It will be appreciated that this showing in Figure 4 is purely diagrammatic simply to illustrate a possible arrangement of the parts.

As illustrated in Figure 3, the damper shaft 10 is coupled to the wheel shaft 305 by means of an arm 320 clamped to the shaft 10 by a bolt 321, and a link 322 pivotally connected to the arm 320 by a shaft 324 and pivotally connected to the wheel shaft 305 by means of a pin 326. It will be understood that the support structure 300 is carried from the fuselage of the aircraft in such a manner as to provide clearance for movement of the link 322 as the shaft 305 rotates through 360°. The dimensions of the arm 320 and link 322 may be such that the arm 320 and shaft 10 will oscillate through approximately 120° as shaft 305 rotates through 360°.

Figure 5:
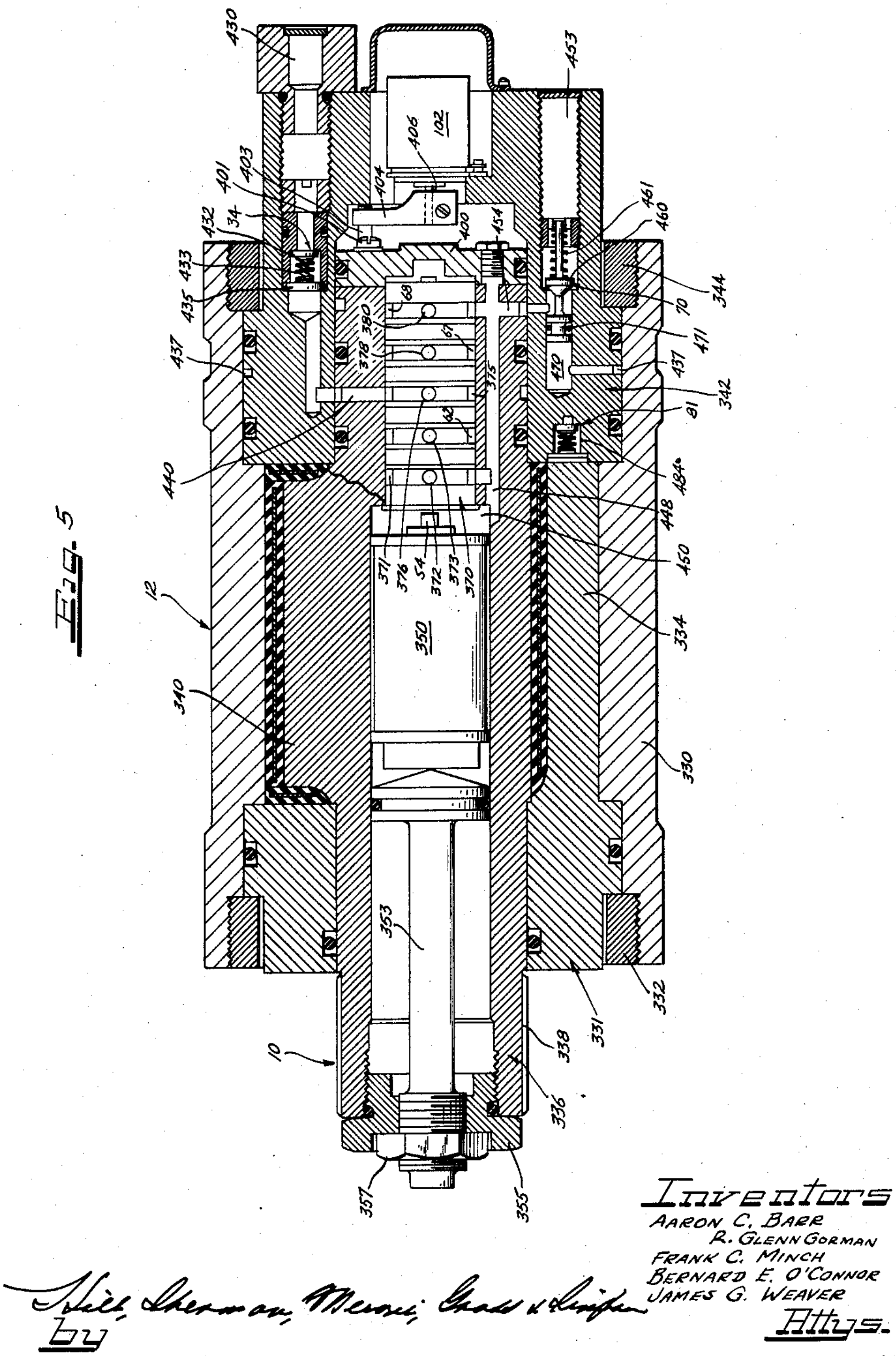
Figure 5 is a somewhat schematic longitudinal sectional view of a steer damper assembly in accordance with the present invention.

Referring to Figure 5, it will be observed that the damping assembly 12 may comprise a sleeve-like housing member 330 having a stationary vane member 331 secured in fixed relation therein by means of a retainer 332. It will be appreciated that the vane portions such as 334 in Figure 5 correspond to the fixed vane portions 13 and 14, indicated diagrammatically in Figure 1. The shaft 10 comprises a tubular part 336 having a fluted end portion 338 which, as illustrated in Figure 3, is secured with the arm 320 for transmitting rotation of the shaft 10 to the nose wheel 307 of the aircraft or the like.

The damper shaft part 336 has integral vane portions such as 340 corresponding to vanes 15 and 16 illustrated diagrammatically in Figure 1. As indicated in Figure 3, the damper assembly 12 may be mounted vertically in the aircraft with the end 338 of the shaft 10 uppermost.

At the lower end of the housing part 330, a valve block 342 is inserted and maintained in fixed relation to the housing part 330 by means of retainer 344.

It will be observed that the shaft part 336 is hollow and receives therein the force motor assembly 350 having the shiftable armature which has been given the reference numeral 54 to correspond to the diagrammatic illustration in Figure 1. The deenergized position of the armature may be adjusted by means of a plunger member 353 which is threadedly engaged in a cap 355, the plunger member 353 being locked in adjusted position by means of a lock nut 357.

In Figure 5, the reference numeral 370 designates the housing for the servo valve body 56 shown diagrammatically in Figure 1, and the various annular chambers formed between the casing 370 and the interior wall of the shaft member 336 have been given corresponding reference numerals in Figures 1 and 5. In Figure 5, external annular chamber 371 communicates with the interior of the casing 370 by means of a port 372; external chamber 62 communicates with the interior of the casing by means of a port 373; external chamber 375 communicates with an interior chamber indicated at 35 in Figure 1 by means of a port 376; external chamber 67 is connected to the interior of the casing by means of a port 378; and external chamber 68 is connected to the interior of the casing by means of a port 380. The interior of the casing 370 is adequately represented in Figure 1, and the various passages and chambers are correspondingly arranged in Figures 1 and 5, except that the valves are in an opposite horizontal orientation.

A closure plate 400 is secured to the damper shaft part 336 by means of bolts such as 401, and the plate 400 carries a pin 403 in fixed relation thereto which actuates an arm 404 carried on the shaft 406 of the synchro transmitter which has been given the reference numeral 102 both in Figures 2 and 5. The connection 403, 404, 406 thus corresponds to the mechanical coupling indicated at 103 in Figures 1 and 2 between the shaft 10 and the transmitter rotor winding which has been illustrated as winding 110 in Figure 2. The casing and stator windings 150, 151 and 152 of the synchro transmitter 102 are, of course, fixedly secured to the valve block 342 which in turn is fixed in relation to the support structure 300 of Figure 3. The shaft 10 turns with the wheel shaft 305 in Figure 3, which as illustrated in Figure 4 is coupled to the steering wheel 307 of the aircraft. Thus, the shaft 406 of the transmitter 102 will correspond in angular position to the angular position of the wheel 307 on the shaft 305.

Figure 9:
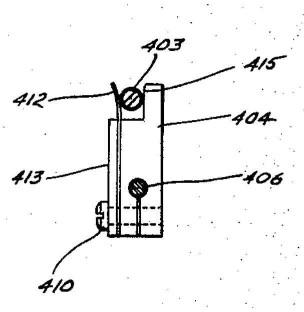
Figure 9 is a fragmentary sectional view illustrating the details of the coupling between the damper shaft and the wheel position sensor of Figure 5.

Figure 9 illustrates a preferred form of coupling between the pin 403 and the shaft 406 wherein the arm 404 is clamped to the shaft 406 by means of a screw 410 which also clamps a leaf spring member 412 and a plate 413 with the arm 404. The pin 403 is confined in a notch 415 of the arm 404 by means of the free end of spring 412 so that the arm 404 will rigidly follow movements of the pin 403 without any backlash. The spring 412 resiliently presses the pin 403 against the side of the notch 415 with sufficient pressure so that there will never be any lag between the motion of the damper shaft 10 and the synchro shaft 406 during operation.

In Figure 5, inlet pressure may be connected to an inlet port 430 of valve block 342 from a line corresponding to line 31 in Figure 1. The check valve in the inlet line in Figure 5 has been designated generally by the reference numeral 34 to correspond to the check valve 34 diagrammatically indicated in Figure 1. The check valve 34 comprises a valve member 432 urged by means of a spring 433 against a valve seat, the spring 433 being seated against a suitable spider-type member 435. Inlet pressure is communicated to a control pressure chamber 437 at the perimeter of the valve block 342 by suitable passages (not shown in Figure 5) and a radial passage 440 affords communication between the inlet passage 430 in the valve block and the external chamber 375 of the servo valve casing 370. Inlet pressure communicates with the central chamber 35 shown in Figure 1 from the external chamber 375 by means of the port 376 in Figure 5. Fluid discharged from the orifice 43 shown in Figure 1 flows into passage 448 in the damper shaft member 336 by means of a passage (not shown) and fluid discharged through the orifice 44 shown in Figure 1 is removed from a chamber 450 by means of the same passage 448 which communicates with outlet 453 by means of a radial passage 454 in shaft member 336. Outlet control valve 70 comprises a valve member 460 urged against its seat by spring means 461. Pressure from peripheral chamber 437 is referenced to a control chamber 470 for shifting a piston member 471 to unseat the valve member 460 when pressure is supplied to the inlet 430. Normally the spring 461 maintains the valve member 460 in closed relation to its seat.

Figure 14:
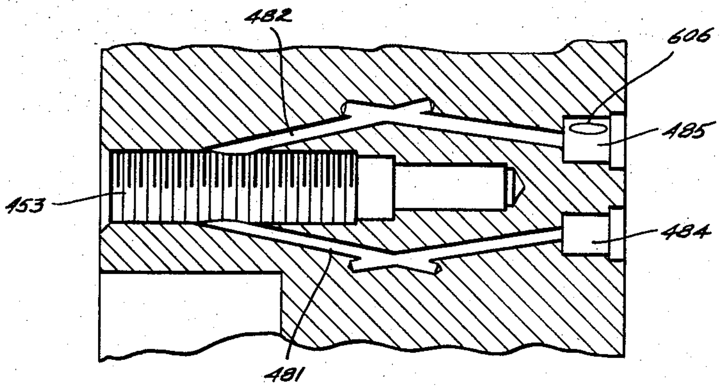
Figure 14 is a fragmentary enlarged longitudinal sectional view taken generally along the line XIV—XIV of Figure 10.

Replenishing pressure to maintain a full supply of fluid for shimmy damping when power is off is maintained on the working chambers from the outlet 453 through passages such as indicated at 481 and 482 in Figure 14 which connect to chambers 484 and 485 on either side of the stationary vane member 334. In each of the chambers such as 484 shown in Figure 5, a replenishing check valve such as indicated at 81 in Figure 1 is provided comprising a valve member spring urged against its seat to prevent flow out of the working chambers while accommodating replenishing flow from the outlet 453 as required.

Figure 6:
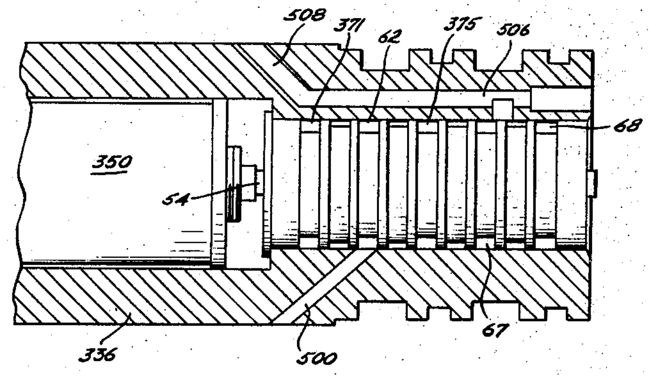
Figure 6 is a fragmentary enlarged view of a portion of the structure of Figure 5.
Figure 8:
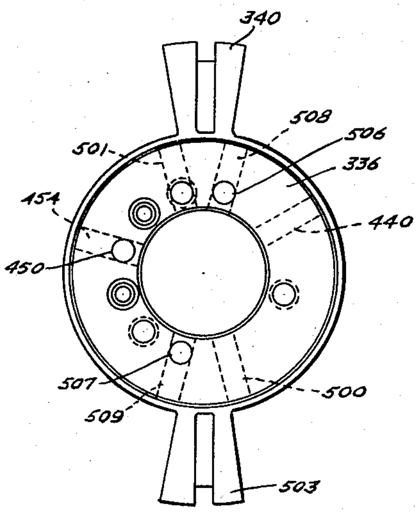
Figure 8 is an end elevational view of the damper shaft of Figure 5.

The manner in which chambers 62 and 67 communicate with the respective working chambers, as shown diagrammatically in Figure 1, is illustrated in Figure 6 in more detail. Two passages 500 and 501 (Figure 8) extend angularly from the chamber 62 to respective diagrammatically opposite working chambers. As seen in Figure 8, the passages 500 and 501 open closely adjacent respective opposite movable vanes 340 and 503 of the rotor assembly 336. Similarly two passages such as indicated at 506 and 507 in Figure 8 extend longitudinally along the damper shaft as seen in Figure 6 and connect with angularly extending passages 508 and 509, leading to the other pair of diametrically opposite working chambers. The function of these passages will be apparent from a consideration of Figure 1 and the previous description.

Figure 7:
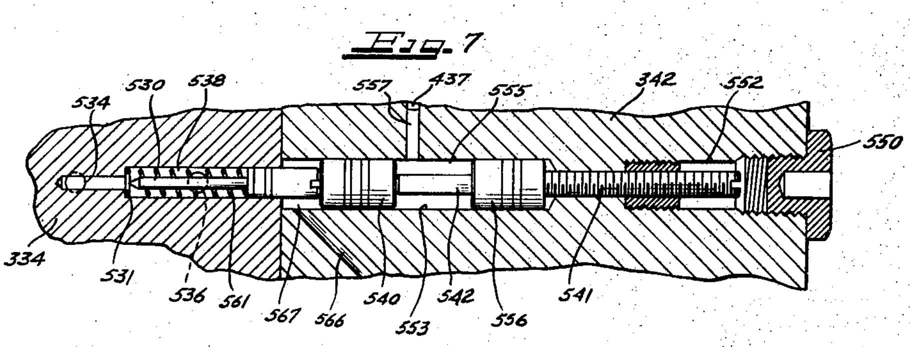
Figure 7 is a fragmentary enlarged view of a further portion of the structure of Figure 5 illustrating the damping control mechanism thereof.
Figures 11, 12, 13:
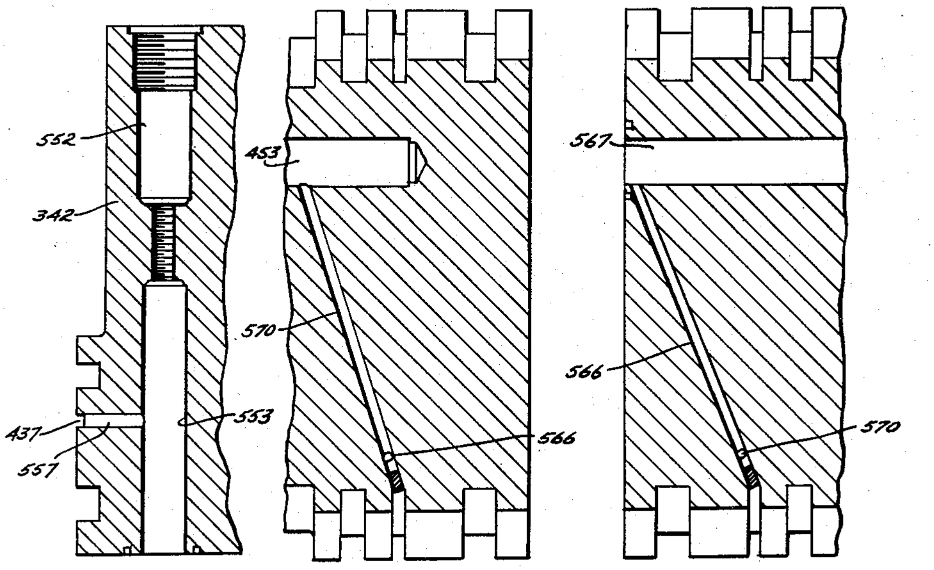
Figure 11 is a fragmentary enlarged longitudinal sectional view taken generally along the line XI—XI of Figure 10.
Figure 12 is a fragmentary enlarged longitudinal sectional view taken generally along the line XII—XII of Figure 10.
Figure 13 is a fragmentary enlarged sectional view taken generally along the line XIII—XIII of Figure 10.

Figure 7 illustrates the damper control valve corresponding to the valve 72 and damping orifice 74 shown in Figure 1. The damper valve member 530 cooperates with its seat 531 to define a metering orifice controlling communication between a passage 534 leading to one working chamber on one side of the fixed vane 334 and a second passage 536 which leads to a second working chamber on the opposite side of the fixed vane 334. The passage 536 is schematically indicated in Figure 7 for ease of visualization, but actually is disposed on the side of bore 538 which is not shown in Figure 7. The metering position of the valve member 530 is determined by means of a piston structure 540 and screw adjustment means 541 having a rod 542 which abuts the piston 540 to limit movement of the piston 540 in the direction to open the damping orifice. The mechanism 541 may be adjusted by removing the plug 550 which threads into the bore 552 seen in Figures 7 and 11. The piston 540 is thus slidable in the bore 553 and when inlet control pressure is applied to the chamber 555 between piston 540 and adjustment piston 556 by means of the peripheral pressure chamber 437 and the passage 557, the valve member 530 will be moved to closed position against the action of the spring 561. To return the valve member 530 to the damping position shown in Figure 7 when the control pressure is removed from chamber 555, a passage 566 is provided communicating with a chamber 567 at the opposite end of the piston structure 540 from the chamber 555. Figures 12 and 13 illustrate the manner in which the passage 566 connects with the passage 570 which extend from the outlet 453.

Figure 10:
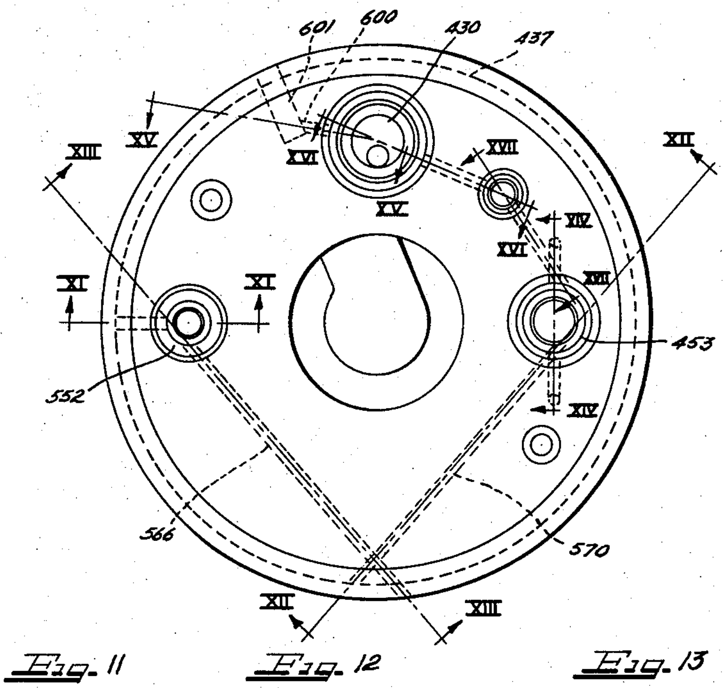
Figure 10 is an end elevational view of the valve block of Figure 5.
Figure 15:
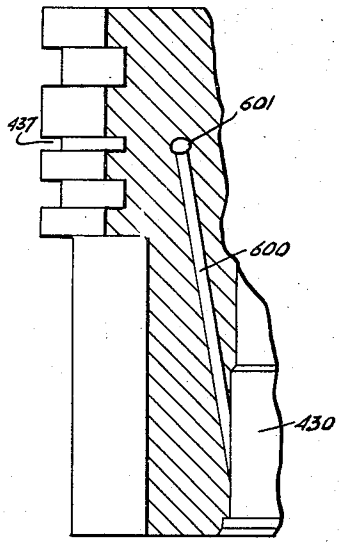
Figure 15 is a fragmentary enlarged longitudinal sectional view taken generally along the line XV—XV of Figure 10.

Figure 15 illustrates the manner in which inlet pressure from 430 is referenced to the pressure chamber 437 through passages 600 and 601, passages 600 and 601 also appearing in Figure 10.

Figure 16:
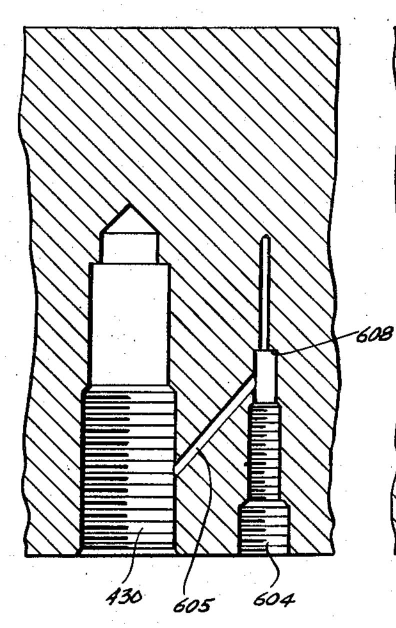
Figure 16 is a fragmentary enlarged longitudinal sectional view taken generally along the line XVI—XVI of Figure 10.
Figure 17:
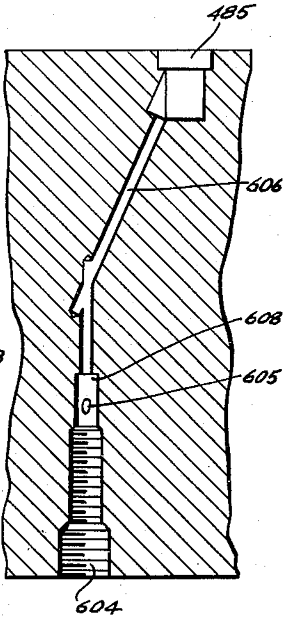
Figure 17 is a fragmentary enlarged longitudinal sectional view taken generally along the line XVII—XVII of Figure 10.

Figures 16 and 17 illustrate the manner in which the thermal relief valve 89' of Figure 1 may be installed, the valve being inserted in the bore 604 which communicates with the inlet 430 by means of a passage 605 and with the chamber 485 by means of a passage 606. It will be understood that the relief valve may cooperate with the shoulder 608 which may act as a valve seat and be normally closed as illustrated for the relief valve diagrammatically shown at 89 in Figure 1.

SUMMARY OF OPERATION

*Damping mode*

In the damping mode of operation, the control circuit of Figure 2 will be deenergized and inlet control valve 33 in Figure 1 will be in its normal position to cut off the supply of pressure to the hydraulic control circuit of Figure 1. With no pressure applied to line 31 in Figure 1, check valve 70 shown in Figures 1 and 5 will be in closed position and damping control valve 72 in Figure 1 will be in open position. In Figure 7, the valve member 530 of the damping assembly will be moved off of its seat 531 by the spring 561 to provide the damping orifice which corresponds to orifice 74 diagrammatically indicated in Figure 1. Rotational movement of the shaft 10 will now be damped by means of the damping orifice provided by the valve member 530 in Figure 7. Passage 566 acts as a drain to permit a fast shift of valve member 530 to its closed position for steering operation.

*Steering mode*

In the steering mode, the inlet solenoid 140' in Figure 1 will be energized to place inlet control valve 33 in the position to supply pressure to the line 31 in Figure 1 corresponding to the inlet 430 in Figure 5. If the pilot desires to turn the nose wheel in a given direction, the rudder is operated in the corresponding direction to actuate linkage 101 in Figure 2, to cause the rotor winding 109 of the synchro transmitter 100 to assume a new position out of correspondence with the rotor winding 110 of the nose wheel synchro transmitter 102. A signal is generated by the amplifier circuit 104 in Figure 2 which energizes the windings 65 and **65*a* in Figure 1 to shift the armature 54 relative to the orifice 44 of the servo valve 36. This causes a corresponding shifting of the valve body 56 to apply inlet pressure to one set of diametrically opposite working chambers and to connect the opposite set of working chambers with the outlet. The nose wheel is thus turned into correspondence with the rudder position to move the rotor winding 110 of the nose wheel synchro into alignment with the steering synchro rotor 109**.

If it is desired to center the nose wheel, the steering rotor 109 is disconnected by moving switch blade 275 to contact terminal 277 which automatically applies a centering signal to the synchro 102.

In the event of any power failure, springs 47 and 60 in Figure 1 will automatically center the valve member 57 to place the system in the damping mode. There is no mechanical connection between the nose wheel steering unit and the rudder control so that mechanical damage or failure resulting in the jamming of the nose wheel steering unit cannot interfere with the flight controls of the aircraft. Free castering of the nose wheel is permissible during the damping mode. It will be observed that the damping valve 530 in Figure 7 will be closed during the steering mode to prevent loss of pressure between the working chambers. This corresponds to the condition in the diagrammatic illustration in Figure 1 where the valve 72 is in its closed position. The servo valve 36 is operated by two small coils 65 and **65*a*** in parallel. Failure of one coil will cause a small reduction in servo loop gain but will not cause system failure. If protection is required against complete severance of an electrical cable, an extra lead wire can be run through the cable, severance of which would switch the system to the damping mode. The steering ratio using standard synchros will be constant. By the use of synchro transmitters having specially shaped stators, any variable steering ratio can be provided.

It will be apparent that many modifications and variations may be effected without departing from the scope of the novel concepts of the present invention.

We claim as our invention:

1. In combination, an aircraft wheel assembly, a pilot steering control, a first electrical position transmitter having a movable element, means connecting said movable element of said first electrical position transmitter to said steering control for maintaining the angular position of said movable element of said first electrical position transmitter in correspondence with the angular position of said steering control, a second electrical position transmitter having a movable element, means connecting said movable element of said second electrical position transmitter to said wheel assembly for maintaining the angular position of said movable element of said second electrical position transmitter in correspondence with the angular position of said wheel assembly, an electric control circuit connecting said first and second electrical position transmitters to generate an error signal when the movable element of the second transmitter is out of electrical alignment with the movable element of the first transmitter, a fluid pressure steering system operatively connected to said wheel assembly for steering said wheel assembly, a servo valve assembly operatively connected to said steering system for controlling actuation of said steering system to steer the wheel assembly, and servo valve control means connected to the electrical control circuit for receiving the error signal therefrom and operatively connected to the servo valve assembly for shifting the servo valve assembly in accordance with the error signal to actuate said steering system to move the wheel assembly in a direction to bring said movable element of said second transmitter into electrical alignment with said movable element of said first transmitter, the position of the steering control and of the movable element of the first transmitter in operation always bearing a predetermined relationship to the position of the wheel assembly and of the movable element of the second transmitter when the movable elements of the first and second transmitters are in electrical alignment whereby the position of the wheel assembly may be sensed from the position of the steering control.

2. In combination, an aircraft wheel assembly, a pilot steering control, a first electrical position transmitter having a movable element, means connecting said movable element of said first electrical position transmitter to said steering control for maintaining the angular position of said movable element of said first electrical position transmitter in correspondence with the angular position of said steering control, a second electrical position transmitter having a movable element, means connecting said movable element of said second electrical position transmitter to said wheel assembly for maintaining the angular position of said movable element of said second electrical position transmitter in correspondence with the angular position of said wheel assembly, an electric control circuit connecting said first and second electrical position transmitters to generate an error signal when the movable element of the second transmitter is out of electrical alignment with the movable element of the first transmitter, a fluid pressure steering system operatively connected to said wheel assembly for steering said wheel assembly, a servo valve assembly operatively connected to said steering system for controlling actuation of said steering system to steer the wheel assembly, and servo valve control means connected to the electrical control circuit for receiving the error signal therefrom and operatively connected to the servo valve assembly for shifting the servo valve assembly in accordance with the error signal to actuate said steering system to move the wheel assembly in a direction to bring said movable element of said second transmitter into electrical alignment with said movable element of said first transmitter, the position of the steering control and of the movable element of the first transmitter in operation always bearing a predetermined relationship to the position of the wheel assembly and of the movable element of the second transmitter when the movable elements of the first and second transmitters are in electrical alignment whereby the position of the wheel assembly may be sensed from the position of the steering control, said electrical control circuit generating an error signal in accordance with the magnitude and direction of the electrical misalignment between the movable elements of the first and second transmitters, and said servo valve control means being operative to adjust said servo valve assembly in accordance with the magnitude and direction of the error signal from the electric control circuit to actuate said steering system to move said wheel assembly in a direction to reduce the magnitude of the error signal and to move the wheel assembly at a rate in accordance with the magnitude of the error signal.

3. In combination, an aircraft wheel assembly, a pilot steering control, a first electrical position transmitter having a movable element, means connecting said movable element of said first electrical position transmitter to said steering control for maintaining the angular position of said movable element of said first electrical position transmitter in correspondence with the angular position of said steering control, a second electrical position transmitter having a movable element, means connecting said movable element of said second electrical position transmitter to said wheel assembly for maintaining the angular position of said movable element of said second electrical position transmitter in correspondence with the angular position of said wheel assembly, an electric control circuit connecting said first and second electrical position transmitters to generate an error signal when the movable element of the second transmitter is out of electrical alignment with the movable element of the first transmitter, a fluid pressure steering system operatively connected to said wheel assembly for steering said wheel assembly, a servo valve assembly operatively connected to said steering system for controlling actuation of said steering system to steer the wheel assembly, and servo valve control means connected to the electrical control circuit for receiving the error signal therefrom and operatively connected to the servo valve assembly for shifting the servo valve assembly in accordance with the error signal to actuate said steering system to move the wheel assembly in a direction to bring said movable element of said second transmitter into electrical alignment with said movable element of said first transmitter, the position of the steering control and of the movable element of the first transmitter in operation always bearing a predetermined relationship to the position of the wheel assembly and of the movable element of the second transmitter when the movable elements of the first and second transmitters are in electrical alignment whereby the position of the wheel assembly may be sensed from the position of the steering control, said servo valve assembly comprising a valve body shiftable in respective opposite directions from a center position in controlling application of fluid pressure to said fluid pressure steering system to move the wheel assembly in respective opposite directions, said servo valve control means comprising an armature coupled to the valve body for controlling the position of the valve body, solenoid means for shifting the armature in respective opposite directions to correspondingly shift the valve body, and a servo amplifier connected to the electric control circuit for receiving the error signal therefrom to energize the solenoid means in accordance with the polarity and magnitude of the error signal generated by the electric control circuit.

4. In combination, an aircraft wheel assembly, a pilot steering control, a first electrical position transmitter having a movable element, means connecting said movable element of said first electrical position transmitter to said steering control for maintaining the angular position of said movable element of said first electrical position transmitter in correspondence with the angular position of said steering control, a second electrical position transmitter having a movable element, means connecting said movable element of said second electrical position transmitter to said wheel assembly for maintaining the angular position of said movable element of said second electrical position transmitter in correspondence with the angular position of said wheel assembly, an electric control circuit connecting said first and second electrical position transmitters to generate an error signal when the movable element of the second transmitter is out of electrical alignment with the movable element of the first transmitter, a fluid pressure steering system operatively connected to said wheel assembly for steering said wheel assembly, a servo valve assembly operatively connected to said steering system for controlling actuation of said steering system to steer the wheel assembly, and servo valve control means connected to the electrical control circuit for receiving the error signal therefrom and operatively connected to the servo valve assembly for shifting the servo valve assembly in accordance with the error signal to actuate said steering system to move the wheel assembly in a direction to bring said movable element of said second transmitter into electrical alignment with said movable element of said first transmitter, the position of the steering control and of the movable element of the first transmitter in operation always bearing a predetermined relationship to the position of the wheel assembly and of the movable element of the second transmitter when the movable elements of the first and second transmitters are in electrical alignment whereby the position of the wheel assembly may be sensed from the position of the steering control, said servo valve assembly comprising a valve body shiftable in respective opposite directions from a center position in controlling application of fluid pressure to said fluid pressure steering system to move the wheel assembly in respective opposite directions, said servo valve control means comprising an armature coupled to the valve body for controlling the position of the valve body, solenoid means for shifting the armature in respective opposite directions to correspondingly shift the valve body, and a servo amplifier connected to the electric control circuit for receiving the error signal therefrom to energize the solenoid means in accordance with the polarity and magnitude of the error signal generated by the electric control circuit, said servo valve assembly having spring means acting on said valve body to automatically move the valve body to said center position in case of a power failure.

5. In combination, an aircraft wheel assembly, a pilot steering control, a first electrical position transmitter having a movable element, means connecting said movable element of said first electrical position transmitter to said steering control for maintaining the angular position of said movable element of said first electrical position transmitter in correspondence with the angular position of said steering control, a second electrical position transmitter having a movable element, means connecting said movable element of said second electrical position transmitter to said wheel assembly for maintaining the angular position of said movable element of said second electrical position transmitter in correspondence with the angular position of said wheel assembly, an electric control circuit connecting said first and second electrical position transmitters to generate an error signal when the movable element of the second transmitter is out of electrical alignment with the movable element of the first transmitter, a fluid pressure steering system operatively connected to said wheel assembly for steering said wheel assembly, a servo valve assembly operatively connected to said steering system for controlling actuation of said steering system to steer the wheel assembly, and servo valve control means connected to the electrical control circuit for receiving the error signal therefrom and operatively connected to the servo valve assembly for shifting the servo valve assembly in accordance with the error signal to actuate said steering system to move the wheel assembly in a direction to bring said movable element of said second transmitter into electrical alignment with said movable element of said first transmitter, the position of the steering control and of the movable element of the first transmitter in operation always bearing a predetermined relationship to the position of the wheel assembly and of the movable element of the second transmitter when the movable elements of the first and second transmitters are in electrical alignment whereby the position of the wheel assembly may be sensed from the position of the steering control, said servo valve assembly comprising a valve body shiftable in respective opposite directions from a center position and having an infinite number of positions within its operating range on either side of said center position and controlling supply of fluid pressure to said fluid pressure steering system in accordance with the direction and amount of displacement of the valve body from said center position, an armature having an infinite number of positions within its operating range on either side of a center position for controlling the position of said valve body, and solenoid means for shifting said armature in respective opposite directions from its center position to correspondingly shift the valve body, and said servo valve control means comprising means connected to said electric control circuit for receiving said error signal therefrom and connecting to said solenoid means for energizing said solenoid means in accordance with the magnitude and direction of the error signal to move said wheel assembly in a direction to reduce said error signal and to move the wheel assembly at a rate in accordance with the magnitude of the error signal.

6. In combination, an aircraft wheel assembly, a pilot steering control, a first electrical position transmitter having a movable element, means connecting said movable element of said first electrical position transmitter to said steering control for maintaining the angular position of said movable element of said first electrical positon transmitter in correspondence with the angular position of said steering control, a second electrical position transmitter having a movable element, means connecting said movable element of said second electrical position transmitter to said wheel assembly for maintaining the angular position of said movable element of said second electrical position transmitter in correspondence with the angular position of said wheel assembly, an electric control circuit connecting said first and second electrical position transmitters to generate an error signal when the movable element of the second transmitter is out of electrical alignment with the movable element of the first transmitter, a fluid pressure steering system operatively connected to said wheel assembly for steering said wheel assembly, a servo valve assembly operatively connected to said steering system for controlling actuation of said steering system to steer the wheel assembly, and servo valve control means connected to the electrical control circuit for receiving the error signal therefrom and operatively connected to the servo valve assembly for shifting the servo valve assembly in accordance with the error signal to actuate said steering system to move the wheel assembly in a direction to bring said movable element of said second transmitter into electrical alignment with said movable element of said first transmitter, the position of the steering control and of the movable element of the first transmitter in operation always bearing a predetermined relationship to the position of the wheel assembly and of the movable element of the second transmitter when the movable elements of the first and second transmitters are in electrical alignment whereby the position of the wheel assembly may be sensed from the position of the steering control, means for simulating a wheel assembly center order of said steering control, and means for disconnecting said first electrical position transmitter from said electric control circuit and for connecting said wheel assembly center order simulating means to said electric control circuit to center the wheel assembly independently of the steering control of the aircraft.

7. In combination, an aircraft wheel assembly, a pilot steering control, a first electrical position transmitter having a movable element, means connecting said movable element of said first electrical position transmitter to said steering control for maintaining the angular position of said movable element of said first electrical position transmitter in correspondence with the angular position of said steering control, a second electrical position transmitter having a movable element, means connecting said movable element of said second electrical position transmitter to said wheel assembly for maintaining the angular position of said movable element of said second electrical position transmitter in correspondence with the angular position of said wheel assembly, an electric control circuit connecting said first and second electrical position transmitters to generate an error signal when the movable element of the second transmitter is out of electrical alignment with the movable element of the first transmitter, a fluid pressure steering system operatively connected to said wheel assembly for steering said wheel assembly, a servo valve assembly operatively connected to said steering system for controlling actuation of said steering system to steer the wheel assembly, and servo valve control means connected to the electrical control circuit for receiving the error signal therefrom and operatively connected to the servo valve assembly for shifting the servo valve assembly in accordance with the error signal to actuate said steering system to move the wheel assembly in a direction to bring said movable element of said second transmitter into electrical alignment with said movable element of said first transmitter, said servo valve assembly and said servo valve control means being carried as a unit with said wheel assembly.

8. In combination, an aircraft wheel assembly, a pilot steering control, a first electrical position transmitter having a movable element, means connecting said movable element of said first electrical position transmitter to said steering control for maintaining the angular position of said movable element of said first electrical position transmitter in correspondence with the angular position of said steering control, a second electrical position transmitter having a movable element, means connecting said movable element of said second electrical position transmitter to said wheel assembly for maintaining the angular position of said movable element of said second electrical position transmitter in correspondence with the angular position of said wheel assembly, an electric control circuit connecting said first and second electrical position transmitters to generate an error signal when the movable element of the second transmitter is out of electrical alignment with the movable element of the first transmitter, a fluid pressure steering system operatively connected to said wheel assembly for steering said wheel assembly, a servo valve assembly operatively connected to said steering system for controlling actuation of said steering system to steer the wheel assembly, and servo valve control means connected to the electrical control circuit for receiving the error signal therefrom and operatively connected to the servo valve assembly for shifting the servo valve assembly in accordance with the error signal to actuate said steering system to move the wheel assembly in a direction to bring said movable element of said second transmitter into electrical alignment with said movable element of said first transmitter, said servo valve assembly and said servo valve control means being carried as a unit with said wheel assembly, said fluid pressure steering system comprising a hollow shaft coupled to said wheel assembly for movement therewith, a series of vanes connected to the exterior of said shaft and a relatively stationary housing surrounding said shaft and having means coacting with said vanes to define fluid pressure chambers for rotating said shaft when a differential in pressure exists between said chambers, said servo valve assembly being mounted within said shaft and having fluid pressure outlet ports communicating with the respective fluid pressure chambers through said shaft for selectively applying fluid pressure to said chambers in accordance with the error signal to move the wheel assembly in a direction to reduce said error signal.

9. In combination, an aircraft wheel assembly, a pilot steering control, a first electrical position transmitter having a movable element, means connecting said movable element of said first electrical position transmitter to said steering control for maintaining the angular position of said movable element of said first electrical position transmitter in correspondence with the angular position of said steering control, a second electrical position transmitter having a movable element, means connecting said movable element of said second electrical position transmitter to said wheel assembly for maintaining the angular position of said movable element of said second electrical position transmitter in correspondence with the angular position of said wheel assembly, an electric control circuit connecting said first and second electrical position transmitters to generate an error signal when the movable element of the second transmitter is out of electrical alignment with the movable element of the first transmitter, a fluid pressure steering system operatively connected to said wheel assembly for steering said wheel assembly, a servo valve assembly operatively connected to said steering system for controlling actuation of said steering system to steer the wheel assembly, and servo valve control means connected to the electrical control circuit for receiving the error signal therefrom and operatively connected to the servo valve assembly for shifting the servo valve assembly in accordance with the error signal to actuate said steering system to move the wheel assembly in a direction to bring said movable element of said second transmitter into electrical alignment with said movable element of said first transmitter, said servo valve assembly and said servo valve control means being carried as a unit with said wheel assembly, said fluid pressure steering system comprising a hollow shaft coupled to said wheel assembly for movement therewith, a series of vanes connected to the exterior of said shaft and a relatively stationary housing surrounding said shaft and having means coacting with said vanes to define fluid pressure chambers for rotating said shaft when a differential in pressure exists between said chambers, said servo valve assembly being mounted within said shaft and having fluid pressure outlet ports communicating with the respective fluid pressure chambers through said shaft for selectively applying fluid pressure to said chambers in accordance with the error signal to move the wheel assembly in a direction to reduce said error signal, said second electrical position transmitter being disposed directly adjacent an end of said shaft and having its movable element coupled thereto.

10. In an aircraft, a retractible support structure, an aircraft wheel assembly carried by said support structure, a pilot steering control, a first electrical position transmitter having a movable element, means connecting said movable element of said first electrical position transmitter to said steering control for maintaining the angular position of said movable element of said first electrical position transmitter in correspondence with the angular position of said steering control, a second electrical position transmitter mounted on said support structure and having a movable element, means connecting said movable element of said second electrical position transmitter to said wheel assembly for maintaining the angular position of said movable element of said second electrical position transmitter in correspondence with the angular position of said wheel assembly, an electric control circuit connecting said first and second electrical position transmitters to generate an error signal when the movable element of the second transmitter is out of electrical alignment with the movable element of the first transmitter, a fluid pressure steering system mounted on said support structure and operatively connected to said wheel assembly for steering said wheel assembly, a servo valve assembly mounted on said support structure and operatively connected to said steering system for controlling actuation of said steering system to steer the wheel assembly, and servo valve control means connected to the electrical control circuit for receiving the error signal therefrom and operatively connected to the servo valve assembly for shifting the servo valve assembly in accordance with the error signal to actuate said steering system to move the wheel assembly in a direction to bring said movable element of said second transmitter into electrical alignment with said movable element of said first transmitter, the position of the steering control and movable element of the first transmitter in operation always bearing a predetermined relationship to the position of the wheel assembly and the movable element of the second transmitter when the movable elements of the first and second transmitters are in electrical alignment whereby the position of the wheel assembly may be sensed from the position of the steering control.

References Cited in the file of this patent

UNITED STATES PATENTS

| | | |
|---|---|---|
| 2,372,710 | Chisholm | Apr. 3, 1945 |
| 2,511,846 | Halpert | June 20, 1950 |
| 2,533,042 | Polson et al. | Dec. 5, 1950 |
| 2,621,002 | Pittman | Dec. 9, 1952 |
| 2,649,841 | Jacques | Aug. 25, 1953 |
| 2,690,192 | Dannhardt | Sept. 28, 1954 |
| 2,767,689 | Moog | Oct. 23, 1956 |
| 2,793,336 | Geyger | May 21, 1957 |